(12) United States Patent
Krendlinger et al.

(10) Patent No.: US 6,761,764 B2
(45) Date of Patent: Jul. 13, 2004

(54) USE OF WAX MIXTURES FOR COATINGS

(75) Inventors: Ernst Krendlinger, Friedberg (DE); Franz-Leo Heinrichs, Gablingen (DE); Dieter Nowicki, Gersthofen (DE)

(73) Assignee: Clariant GmbH, Frankfurt (DE)

( * ) Notice: Subject to any disclaimer, the term of this patent is extended or adjusted under 35 U.S.C. 154(b) by 33 days.

(21) Appl. No.: 10/275,100

(22) PCT Filed: Apr. 27, 2001

(86) PCT No.: PCT/EP01/04778
§ 371 (c)(1),
(2), (4) Date: Nov. 1, 2002

(87) PCT Pub. No.: WO01/85855
PCT Pub. Date: Nov. 15, 2001

(65) Prior Publication Data
US 2003/0154885 A1 Aug. 21, 2003

(30) Foreign Application Priority Data

May 12, 2000 (DE) .......................................... 100 23 441
Dec. 20, 2000 (DE) .......................................... 100 63 422

(51) Int. Cl.[7] .................... C09D 123/06; C09D 123/12; C09D 191/06
(52) U.S. Cl. ........................ 106/502; 106/270; 106/272; 524/477; 524/487; 524/489; 524/490
(58) Field of Search ................................ 106/270, 272, 106/502; 524/477, 487, 489, 490

(56) References Cited

U.S. PATENT DOCUMENTS

| 5,723,705 A | 3/1998 | Herrmann et al. | 585/9 |
| 5,998,547 A | 12/1999 | Hohner | 525/301 |
| 6,080,902 A | 6/2000 | Herrmann et al. | 585/512 |
| 6,107,530 A | 8/2000 | Hohner et al. | 585/9 |
| 6,143,846 A | 11/2000 | Herrmann et al. | 526/170 |
| 6,211,303 B1 | 4/2001 | Hohner | 525/388 |
| 6,331,590 B1 | 12/2001 | Herrmann et al. | 525/55 |
| 6,348,547 B1 | 2/2002 | Deckers et al. | 525/333.8 |

FOREIGN PATENT DOCUMENTS

| EP | 0 571 882 | 12/1993 |
| EP | 0 632 063 | 1/1995 |
| EP | 0 890 584 | 1/1999 |
| EP | 0 890 619 | 1/1999 |
| EP | 0 896 591 | 2/1999 |

*Primary Examiner*—David Brunsman
(74) *Attorney, Agent, or Firm*—Anthony A. Bisulca

(57) ABSTRACT

The invention provides for the use of mixtures of waxes which comprise a) a homopolymer or copolymer of $C_2$–$C_{18}$ α-olefins, prepared by means of metallocene catalysis, and, as auxiliaries, one or more other waxes selected from the group consisting of b) PE waxes,
c) PTFE waxes,
d) PP waxes,
e) amide waxes,
f) FT paraffins,
g) montan waxes,
h) natural waxes,
i) macrocrystalline and microcrystalline paraffins,
j) polar polyolefin waxes, or
k) sorbitan esters for improving the properties of coating materials.

13 Claims, No Drawings

USE OF WAX MIXTURES FOR COATINGS

This application is a 371 of PCT/EP01/04778 filed Apr. 27, 2001.

The present invention relates to the use of metallocene waxes, their oxidates and blends thereof with further waxes, and also the corresponding micronisates, for coating materials.

In the preparation of coating materials, waxes are generally added in a concentration of 0.01–10%. The waxes in question are PE waxes, PTFE waxes, PP waxes, amide waxes, FT paraffins, montan waxes, natural waxes, macrocrystalline and microcrystalline paraffins, polyethylene copolymers, sorbitan esters and metallocene waxes, and also blends thereof, as disclosed in EP-A-0 890 619. The blends may be present in different combinations, both as powder mixtures and as melt mixtures.

These waxes are added in the form of flakes, granules, powders, dispersions, emulsions or micronisates, the preferred use form being regardable as a finely micronized powder with particle sizes up to 4 μm in $DV_{50}$ value. ($DV_{50}$ value: 50% of the wax particles are smaller than or equal to 4 μm). These waxes are used in order to achieve the following effects in the coating materials:

better scratch resistance better abrasion resistance better dispersing of pigments better pigment stability improvement in sedimentation tendency improvement in redispersion of pigments active orienting substance for effect pigments effective flatting satisfactory feel improvement in lubricity improvement in metal marking achieving effective incorporation of effect pigments influencing of rheological properties better blocking resistance better sandability degassing additive in powder coatings additive for increasing throughput in powder coatings.

These wax additives can be used in all coating systems (e.g., low solids, medium solids, high solids, solvent-based coating materials, aqueous or water-dilutable coating materials, powder coating materials, physically drying coating systems, chemically curing coating materials, and radiation-curing coating materials, such as UV coating materials, for example).

Since pure polyethylene waxes and metallocene waxes cannot be used in all coating systems, especially not in aqueous systems, use is also made of wax oxidates.

Since the individual types of wax display different effects in the coating materials, it is preferred to use wax mixtures of PE waxes, PTFE waxes, PP waxes, amide waxes, FT paraffins, montan waxes, natural waxes, macrocrystalline and microcrystalline paraffins, polyethylene copolymers, sorbitan esters and metallocene waxes in order to combine the abovementioned effects with one another and to obtain corresponding improvements in coating materials.

It was an object of the invention to find wax mixtures, for use in coating materials, which exhibit a particularly large number of the effects set out above. Surprisingly, the mixtures with metallocene waxes showed the most marked improvements. With these mixtures, a particular improvement is obtained in the grindability for the production of wax micronisates; in other words, the yields are increased.

A further advantage of using waxes produced by the metallocene process is their ready grindability, for which reason fewer auxiliaries are consumed in this case than in the case of wax mixtures comprising waxes produced, for example, with the Ziegler-Natta process.

The invention provides for the use of mixtures of waxes which comprise a) a homopolymer or copolymer of $C_2$–$C_{18}$ α-olefins, prepared by means of metallocene catalysis, and also degradation waxes produced from relatively high-chain-length polyolefins produced by means of metallocene catalysis, and, as auxiliaries, one or more other waxes selected from the group consisting of b) PE waxes, c) PTFE waxes, d) PP waxes, e) amide waxes, f) FT paraffins, g) montan waxes, h) natural waxes, i) macrocrystalline and microcrystalline paraffins, j) polar polyolefin waxes, or k) sorbitan esters, l) polyamides, m) polyolefins, n) PTFE, o) wetting agents, p) silicates for improving the properties of coating materials.

The invention further provides coating materials comprising the wax mixtures described.

The homopolymer or copolymer of $C_2$–$C_{18}$ α-olefins prepared by means of metallocene catalysis (a) preferably have the following properties:

| | |
|---|---|
| Dropping point (Dp): | 80–165° C. |
| Acid number (AN): | 0–50 mg KOH/g |
| Density: | 0.87–1.03 g/cm³ |
| Melt viscosity at 170° C.: | 10–100 000 mPas. |

Suitable polyolefin waxes include homopolymers of ethylene or propylene or copolymers of ethylene or propylene with one another or with one or more 1-olefins. 1-Olefins used include linear or branched olefins having 4–18 carbon atoms, preferably 4–6 carbon atoms. These olefins may have an aromatic substitution which is in conjugation with the olefinic double bond. Examples of such compounds are 1-butene, 1-hexene, 1-octene or 1-octadecene, and also styrene. Preference is given to copolymers of ethylene with propene or 1-butene. Ethylene copolymers of this kind have ethylene contents of 70–99.9% by weight, preferably 80–99% by weight.

Especially suitable polyolefin waxes are those having a dropping point of between 90 and 160° C., preferably between 100 and 155° C., a melt viscosity at 140° C. of between 10 and 10 000 mPas, preferably between 50 and 5 000 mPas, and a density at 20° C. of between 0.89 and 0.96 g/cm³, preferably between 0.91 and 0.94 g/cm³.

Also suitable are metallocene waxes modified by oxidation, such as may be obtained, for example, by treating the wax melt with air in accordance with EP-A-0 896 591. The disclosure content of this document in respect of the oxidative treatment of wax melts is hereby incorporated into the present specification by reference.

Metallocene catalysts for preparing the polyolefin waxes are chiral or nonchiral transition metal compounds of the formula $M^1L_x$. The transition metal compound $M^1L_x$ contains at least one central metal atom $M^1$ to which at least one π ligand, e.g., a cyclopentadienyl ligand, is attached. Furthermore, substituents, such as halogen, alkyl, alkoxy or aryl groups, for example, may be attached to the central metal atom $M^1$. $M^1$ is preferably an element from main group III, IV, V or VI of the periodic table of the elements, such as Ti, Zr or Hf. Cyclopentadienyl ligand comprehends unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π ligands may be bridged or non-bridged, with both single and multiple bridges—including bridges via ring systems—being possible. The metallocene designation also embraces compounds having more than one metallocene fragment, known as polynuclear metallocenes. These may have arbitrary substitution patterns and bridging variants. The individual metallocene fragments of such polynuclear metallocenes may be both identical to one another and different from one another. Examples of such polynuclear metallocenes are described, for example, in EP-A-0 632 063. Examples of general structural formulae of metallocenes and also of their activation with a cocatalyst are given, inter alia, in EP-A-0 571 882. The disclosure contents of these subjects in the two documents is hereby incorporated by reference.

Additive b) comprises, in preferred embodiments, polyethylene homopolymer and copolymer waxes which have not been prepared by means of metallocene catalysis and which have a number-average molecular weight of from 700 to 10 000 g/mol with a dropping point of between 80 and 140° C.

Additive c) comprises in preferred embodiments polytetrafluoroethylene having a molecular weight of between 30 000 and 2 000 000 g/mol, in particular between 100 000 and 1 000 000 g/mol.

Additive d) comprises, in preferred embodiments, polypropylene homopolymer and copolymer waxes which have not been prepared by means of metallocene catalysis and which have a number-average molecular weight of from 700 to 10 000 g/mol with a dropping point of between 80 and 160° C.

Additive e) comprises, in preferred embodiments, amide waxes preparable by reacting ammonia or ethylenediamine with saturated and/or unsaturated fatty acids. The fatty acids comprise, for example, stearic acid, tallow fatty acid, palmitic acid or erucic acid.

Additive f) comprises, in preferred embodiments, FT paraffins having a number-average molecular weight of from 400 to 800 g/mol with a dropping point from 80 to 125° C.

Additive g) preferably comprises montan waxes, including acid waxes and ester waxes having a carboxylic acid carbon chain length of from $C_{22}$ to $C_{36}$.

The ester waxes preferably comprise reaction products of the montanic acids with monohydric or polyhydric alcohols having 2 to 6 carbon atoms, such as ethanediol, butane-1, 3-diol or propane-1,2,3-triol, for example.

Additive h) in one preferred embodiment comprises carnauba wax or candelilla wax.

Additive i) comprises paraffins and microcrystalline waxes which are obtained in the course of petroleum refining. The dropping points of such paraffins are preferably between 45 and 65° C., those of microcrystalline waxes of this kind preferably between 73 and 100° C.

Additive j) comprises, in preferred embodiments, polar polyolefin waxes preparable by oxidizing ethylene or propylene homopolymer and copolymer waxes or grafting them with maleic anhydride. Particularly preferred starting material for this purpose comprises polyolefin waxes having a dropping point of between 90 and 165° C., in particular between 100 and 160° C., a melt viscosity at 140° C. (polyethylene waxes) or at 170° C. (polypropylene waxes) of between 10 and 10000 mPas, in particular between 50 and 5000 mPas, and a density at 20° C. of between 0.85 and 0.96 g/cm³.

Additive k) comprises, in preferred embodiments, reaction products of sorbitol with saturated and/or unsaturated fatty acids and/or montanic acids. The fatty acids comprise, for example, stearic acid, tallow fatty acid, palmitic acid or erucic acid.

Additive l) preferably comprises ground polyamides, examples being polyamide-6, polyamide-6,6 or polyamide-12. The particle size of the polyamides is preferably in a range of 5–200 μm, in particular 10–100 μm.

Additive m) comprises polyolefins, i.e., for example, polypropylene, polyethylene or copolymers of propylene and ethylene of high or low density with molar weights of preferably from 10 000 to 1 000 000 D, in particular from 15 000 to 500 000 D, as numerical averages of the molecular weight, whose particle size as a result of grinding is in the range of preferably 5–200 μm, in particular 10–100 μm.

Additive n) comprises thermoplastic PTFE having a molar weight of preferably 500 000–10 000 000 D, in particular 500 000–2 000 000 D, as numerical average, whose particle size as a result of grinding is in the range of preferably 5–200 μm, in particular 10–100 μm.

Additive o) comprises amphiphilic compounds which generally lower the surface tension of liquids. The wetting agents comprise, for example, alkyl ethoxylates, fatty alcohol ethoxylates, alkylbenzenesulfonates or betaines.

Additive p) comprises silicates which are not used as filler or pigment in the formulas. It is preferred to use silicas or talc.

The proportion of ingredient a) to ingredients b) to p) may be varied in the range from 1 to 99% by weight a) to 1 to 99% by weight b) to p). Where a mixture of two or more of ingredients b) to p) is used, the indicated amount applies to the sum of the amounts of these ingredients.

In one preferred embodiment, the waxes are used in micronized form for the purpose according to the invention. Particular preference is given to the use of polyolefin wax and optionally admixed auxiliaries and additives as an ultrafine powder with a particle size distribution $d_{90}<40$ μm.

Parameters improved include the flatting of the coating materials, the dispersibility and stability (sedimentation tendency or bodying tendency) in coating materials and dispersions, an improvement in the slip, hardness and abrasion resistance, an increase in the throughput and improvement in pigment dispersion in powder coating materials, and better antiblocking and handling sensation (soft feel). The wax mixtures generally comprise powder mixtures and/or melt mixtures.

EXAMPLES

TABLE 1

Characterization of the ingredients of the wax mixtures used

| Wax type | Acid number | Dropping point | Viscosity |
|---|---|---|---|
| Metallocene PE wax | 0 mg KOH/g | 124° C. | 250 mPas (140° C.) |
| Metallocene PP wax | 0 mg KOH/g | 135° C. | 40 mPas (170° C.) |

TABLE 1-continued

Characterization of the ingredients of the wax mixtures used

| Wax type | Acid number | Dropping point | Viscosity |
|---|---|---|---|
| Oxidized metallocene PE wax | 20 mg KOH/g | 114° C. | 200 mPas (120° C.) |
| PE wax | 0 mg KOH/g | 125° C. | 300 mPas (140° C.) |
| PP wax | 0 mg KOH/g | 160° C.* | 1500 mPas (170° C.) |
| Oxidized PE wax | 20 mg KOH/g | 114° C. | 200 mPas (120° C.) |
| Amide wax | 6 mg KOH/g | 140° C. | 10 mPas (150° C.) |
| Montan wax 1 | 17 mg KOH/g | 82° C. | 30 mPas (100° C.) |
| Montan wax 2 | 14 mg KOH/g | 100° C. | 300 mPas (120° C.) |
| Carnauba wax | 9 mg KOH/g | 82° C. | 30 mPas (90° C.) |
| FT paraffin | 0 mg KOH/g | 110° C. | 20 mPas (120° C.) |

*Softening point

TABLE 2

Wax mixtures (all mixtures micronized to $DV_{50} = 8\ \mu m$)

| Code | Ingredient 1 | Ingredient 2 | Ingredient 3 | Proportion |
|---|---|---|---|---|
| M1 | Oxidized metallocene PE wax | Carnauba wax | — | 1:1 |
| M2 | Metallocene PE wax | Oxidized metallocene PE wax | — | 7:3 |
| M3 | Metallocene PE wax | Amide wax | — | 1:1 |
| M4 | Metallocene PE wax | PTFE wax | — | 9:1 |
| M5 | Metallocene PE wax | Oxidized metallocene PE wax | PTFE wax | 12:7:1 |
| M6 | Metallocene PP wax | Amide wax | — | 1:1 |
| M7 | Metallocene PP wax | Amide wax | — | 5:1 |
| M8 | Metallocene PP wax | Metallocene PE wax | — | 1:1 |
| M9 | Metallocene PP wax | Oxidized metallocene PE wax | — | 1:1 |
| M10 | Oxidized metallocene PE wax | Montan wax 1 | Montan wax 2 | 2:1:1 |
| M11 | Metallocene PE wax | Oxidized metallocene PE wax | Sorbitan tristearate | 1:1:1 |
| M12 | Metallocene PE wax | FT paraffin | — | 5:1 |
| V1 | Oxidized PE wax | Carnauba wax | — | 1:1 |
| V2 | PE wax | Oxidized PE wax | — | 7:3 |
| V3 | PE wax | Amide wax | — | 1:1 |
| V4 | PE wax | PTFE wax | — | 9:1 |
| V5 | PE wax | Oxidized PE wax | PTFE wax | 12:7:1 |
| V6 | PP wax | Amide wax | — | 1:1 |
| V7 | PP wax | Amide wax | — | 5:1 |
| V8 | PP wax | PE wax | — | 1:1 |
| V9 | PP wax | Oxidized PE wax | — | 1:1 |
| V10 | Oxidized PE wax | Montan wax 1 | Montan wax 2 | 2:1:1 |
| V11 | PE wax | Oxidized PE wax | Sorbitan tristearate | 1:1:1 |
| V12 | PE wax | FT paraffin | — | 5:1 |

Preparation of an Aqueous Wax Dispersion from a Micropowder:

1% by weight of Tylose® is stirred into 60% by weight of water and allowed to swell briefly, after which 39% by weight of micronized oxidized wax is incorporated into the Tylose solution by dispersion.

TABLE 3

Dispersing/stability of wax mixtures

| | Wax | Dispersing/stability |
|---|---|---|
| Example 1 | M1 | good/very good |
| Example 2 | M2 | good/very good |
| Example 3 | M9 | good/very good |
| Example 4 | M10 | very good/very good |
| Example 5 | V1 | good/very good |
| Example 6 | V2 | good/very good |
| Example 7 | V9 | moderate/moderate |
| Example 8 | V10 | good/very good |

Incorporation of an Aqueous Wax Dispersion into an Aqueous Acrylic Varnish:

4% by weight of the wax dispersion specified in example 2 is stirred into 96% by weight of aqueous acrylic varnish (based on Mowilith® LDM 7460) and then drawn down onto a glass plate using a frame coater (60 μm wet film thickness). After drying, the gloss is measured.

TABLE 4

Gloss of the wax mixtures

| | Dispersion from | Base wax | Gloss (60° angle) |
|---|---|---|---|
| Acrylic varnish | no wax | — | 120 |
| Example 9 | Example 1 | M1 | 22 |
| Example 10 | Example 2 | M2 | 25 |
| Example 11 | Example 3 | M9 | 25 |
| Example 12 | Example 4 | M10 | 20 |
| Example 13 | Example 5 | V1 | 30 |
| Example 14 | Example 6 | V2 | 30 |
| Example 15 | Example 7 | V9 | 28 |
| Example 16 | Example 8 | V10 | 25 |

Incorporation of Micronized Waxes into a Nitrocellulose Standard Varnish for Purposes of Matting and Slip:

2% by weight of micronized wax are incorporated by dispersion into 98% by weight of NC varnish by means of a dissolver and then drawn down onto a glass plate using a frame coater (60 μm wet film thickness). After drying, the gloss is measured.

TABLE 5

Gloss and slip of the wax mixtures

| | Wax | Gloss (60° angle) | Slip |
|---|---|---|---|
| Nitrocellulose varnish | No wax | 138 | 0.42 |
| Example 17 | M3 | — | 0.17 |
| Example 18 | M4 | 45 | 0.12 |
| Example 19 | M5 | — | 0.09 |
| Example 20 | M6 | 25 | 0.10 |
| Example 21 | M7 | 25 | — |
| Example 22 | M8 | 30 | 0.25 |
| Example 23 | M9 | 41 | 0.25 |
| Example 24 | M10 | 30 | 0.15 |
| Example 25 | V3 | 27 | 0.22 |
| Example 26 | V4 | 50 | 0.15 |
| Example 27 | V5 | 45 | 0.15 |
| Example 28 | V6 | 30 | 0.17 |
| Example 29 | V7 | 30 | 0.30 |
| Example 30 | V8 | 40 | 0.30 |
| Example 31 | V9 | 50 | 0.28 |
| Example 32 | V10 | 35 | 0.22 |

Incorporation into a White Hybrid Powder Coating Material for the Purpose of Improving the Pencil Hardness and Abrasion Resistance:

The waxes are mixed with the individual raw materials in a high-speed mixer, and then the raw materials are extruded at 110° C. in a twin-screw laboratory extruder (PC19–25 from APV), ground to <125 μm and applied to aluminum or steel sheet. After baking (at 180° C. for 15 minutes) the coated sheets are stored in a controlled-climate chamber for 24 hours, after which the pencil hardness (according to Wolff-Wilborn) is measured and the Taber Abraser abrasion test carried out.

TABLE 6

Pencil hardness and abrasion test

| | Wax, in each case 1% based on total formula | Pencil hardness according to Wolff-Wilborn | Abrasion test after 250 turns |
|---|---|---|---|
| Hybrid powder coating material | No wax | 2B | 52 mg |
| Example 33 | M2 | HB | 48 mg |
| Example 34 | M3 | F | 35 mg |
| Example 35 | M4 | F | 25 mg |
| Example 36 | M6 | F | 20 mg |
| Example 37 | M7 | H | 15 mg |
| Example 38 | M10 | HB | 25 mg |
| Example 39 | V2 | B | 50 mg |
| Example 40 | V3 | HB | 41 mg |
| Example 41 | V4 | HB | 42 mg |
| Example 42 | V6 | B | 46 mg |
| Example 43 | V7 | B | 38 mg |
| Example 44 | V10 | HB | 40 mg |

Incorporation into a Blue Hybrid Powder Coating Material for the Purpose of Improving the Dispersion and Throughput:

The waxes are mixed with one another with the individual raw materials in a high-speed mixer, and then the raw materials are extruded at 110° C. in a twin-screw laboratory extruder (PC19–25 from APV), for which it is necessary to set the metering level to a power consumption of 70% on the extruder; during this procedure, the throughput is detected; the extrudate is then ground to <125 μm and applied to aluminum or steel sheet. After baking (at 180° C. for 15 minutes) the coated sheets are stored in a controlled-climate chamber for 24 hours, after which the depth of color is measured.

TABLE 7

Depth of color

| | Wax, in each case 1% based on total formula | % improvement in throughput | Depth of color |
|---|---|---|---|
| Hybrid powder coating material | No wax | — | 100% |
| Example 45 | M1 | 18% | 110% |
| Example 46 | M2 | 20% | 105% |
| Example 47 | M3 | 15% | 107% |
| Example 48 | M6 | 30% | 105% |
| Example 49 | M8 | 25% | 107% |
| Example 50 | M10 | 50% | 120% |
| Example 51 | V1 | 13% | 107% |
| Example 52 | V2 | 15% | 100% |
| Example 53 | V3 | 10% | 102% |
| Example 54 | V6 | 10% | 100% |
| Example 55 | V8 | 15% | 105% |
| Example 56 | V10 | 45% | 112% |

Incorporation into an Alkyd Resin Varnish for the Purpose of Assessing the Blocking Properties and the Feel:

2% by weight of micronized wax are incorporated into the alkyd resin varnish with the aid of a dissolver, after which the varnish is applied to glass (at least 2 plates in each case) with the aid of a frame coater (60 μm wet film thickness). After storage in a controlled-climate chamber for 24 hours, the feel is assessed (subjectively), after which the plates are stored in an oven at 50° C. for 24 hours. In this case the plates are placed with the coating on top of one another and are loaded with a 500 g weight. Thereafter, the blocking behavior is assessed.

TABLE 8

Assessment of the blocking behavior

| Assessment scheme | Blocking resistance |
|---|---|
| None | No blocking |
| Trace | Very slight blocking evident |
| Little | When the upper board is raised, the underneath board comes with it but parts by itself after a few seconds |
| Some | When the upper board is raised, the underneath board comes with it, but has to be separated by hand without perceptible application of force |
| Marked | When the upper board is raised, the underneath board comes with it but has to be separated with some application of force. |
| Substantial | The plates have to be separated with considerable application of force. |

TABLE 9

Feel characteristics of the wax mixtures

| | Wax | Feel (subjective) | Blocking characteristics |
|---|---|---|---|
| Alkyl resin varnish | No wax | Plasticky, slightly tacky | Substantial |
| Example 57 | M3 | Good feel, no sticking | Trace |
| Example 58 | M4 | Good feel, very smooth | None |
| Example 59 | M6 | Good feel, smooth | Trace |
| Example 60 | M10 | Soft, pleasant, somewhat smooth | Little |
| Example 61 | V3 | Good feel, very slight sticking | Little |
| Example 62 | V4 | Good feel, smooth | Little |
| Example 63 | V6 | Slightly tacky | Some |
| Example 64 | V10 | Pleasant | Little |

Incorporation into a 2K PU Varnish, Applied to Wooden Boards, and Assessment of sandability:

2 or 4% by weight of micronized wax are incorporated by dispersion into one component of a 2K polyurethane varnish system, after which the 2nd component is added and the composition is applied by brush to a wooden board in a cross pass. The board is then left to dry in a controlled-climate chamber for 24 hours. The sanding test is then carried out, in which a sheet of abrasive paper (240 grit) is stretched over a wooden block, passed over the wooden board 20× without pressure, and then the abrasion is assessed. The lower the level of coating on the abrasive paper, the better the sandability.

TABLE 10

Sandability of additived varnish

| | Wax | Sandability |
|---|---|---|
| 2K PU varnish | No wax | Very poor, abrasive paper clogged after just 10 strokes |
| Example 65 | M1 | Moderate, abrasive paper almost clogged |
| Example 66 | M3 | Very good, no clogging observable after 20 strokes |
| Example 67 | M6 | Very good, no clogging observable after 20 strokes |

TABLE 10-continued

Sandability of additived varnish

| | Wax | Sandability |
|---|---|---|
| Example 68 | M7 | Good, slight clogging of the abrasive paper |
| Example 69 | M10 | Good, slight clogging of the abrasive paper |
| Example 70 | V1 | Poor, abrasive paper clogged after 20 strokes |
| Example 71 | V3 | Good, slight clogging of the abrasive paper |
| Example 72 | V6 | Good, slight clogging of the abrasive paper |
| Example 73 | V7 | Poor, abrasive paper clogged after 20 strokes |
| Example 74 | V10 | Poor, abrasive paper clogged after 20 strokes |

What is claimed is:

1. A method for improving the properties of a coating material comprising the step of adding to the coating material a wax mixture comprising:
   a) a homopolymer or copolymer of C2–C18 a-olefins, prepared by means of metallocene catalysis, and also degradation waxes produced from relatively high-chain-length polyolefins produced by means of metallocene catalysis,
   and, as auxiliaries, one or more other waxes selected from the group consisting of
   b) PE waxes,
   c) PTFE waxes,
   d) PP waxes,
   e) amide waxes,
   f) FT paraffins,
   g) montan waxes,
   h) natural waxes,
   i) macrocrystalline and microcrystalline paraffins,
   j) polar polyolefin waxes, or
   k) sorbitan esters,
   l) polyamides,
   m) polyolefins,
   n) PTFE,
   o) wetting agents,
   p) silicates.

2. The method as claimed in claim 1, wherein ingredient a) is an oxidate of a metallocene wax.

3. The method as claimed in claim 1, wherein ingredient a) comprises a homopolymer or copolymer of ethylene or of propylene.

4. The method as claimed in claim 1, wherein the wax specified as ingredient a) has a melt viscosity at 140° C. of from 10 to 10 000 mPas.

5. The method as claimed in claim 1, wherein the wax specified as ingredient a) has a density of from 0.87 to 1.03 g/cm$^3$.

6. The method as claimed in claim 1, wherein the wax specified as ingredient b) is a polyethylene wax not prepared by means of metallocene catalysis, having a number-average molecular weight of from 700 to 10 000 g/mol.

7. The method as claimed in claim 1, wherein the wax specified as ingredient d) is a polypropylene wax not prepared by means of metallocene catalysis, having a number-average molecular weight of from 700 to 10 000 g/mol.

8. The method as claimed in claim 1, wherein the wax specified as ingredient j) is a polyethylene or polypropylene wax modified by oxidation or grafting with maleic anhydride.

9. The method of claim 1, wherein the wax mixture is in micronized form.

10. A coating material made in accordance with the method of claim 1.

11. A method for improving the properties of a coating material comprising the step of adding to the coating material a wax mixture of comprising:
   a) a homopolymer or copolymer of $C_2$–$C_{18}$ α-olefins, prepared by means of metallocene catalysis, or degradation waxes produced from relatively high-chain-length polyolefins produced by means of metallocene catalysis,
   and, as auxiliaries, one or more other waxes selected from the group consisting of
   b) PE waxes,
   c) PTFE waxes,
   d) PP waxes,
   e) amide waxes,
   f) FT paraffins,
   g) montan waxes,
   h) natural waxes,
   i) macrocrystalline and microcrystalline paraffins,
   j) polar polyolefin waxes, or
   k) sorbitan esters,
   l) polyamides,
   m) polyolefins,
   n) PTFE,
   o) wetting agents,
   p) silicates.

12. The method of claim 11, wherein the wax mixture is in micronized form.

13. A coating material made in accordance with the method of claim 11.

* * * * *